United States Patent [19]

Togawa et al.

[11] Patent Number: 4,480,981
[45] Date of Patent: Nov. 6, 1984

[54] SYSTEM FOR CONTROLLING TEMPERATURE OF MOLTEN RESIN IN CYLINDER OF EXTRUDER

[75] Inventors: Tsuyoshi Togawa; Teruyuki Nakamoto, both of Tokyo; Mitsuo Iwata, Suzuka; Katuhiko Ito, Suzuka; Hideo Sano, Suzuka; Nobutaka Sekine, Suzuka; Tomoe Shibuya, Tokyo, all of Japan

[73] Assignee: Fujikura Ltd., Japan

[21] Appl. No.: 470,147

[22] Filed: Feb. 28, 1983

[30] Foreign Application Priority Data

Feb. 27, 1982 [JP] Japan .................................. 57-31575

[51] Int. Cl.³ ............................................. B29F 3/08
[52] U.S. Cl. .................................. 425/143; 264/40.6; 425/144; 425/162
[58] Field of Search ..................... 425/143, 144, 162; 264/40.6, 40.1

[56] References Cited

U.S. PATENT DOCUMENTS

| 3,733,059 | 5/1973 | Pettit | 264/40.6 |
| 3,751,014 | 8/1973 | Waterloo | 425/144 |
| 3,866,669 | 2/1975 | Gardiner | 425/144 |
| 4,262,737 | 4/1981 | Faillace | 264/40.6 |
| 4,272,466 | 6/1981 | Harris | 264/40.6 |
| 4,290,986 | 9/1981 | Koschmann | 264/40.6 |

FOREIGN PATENT DOCUMENTS

| 55-121042 | 9/1980 | Japan | 425/144 |
| 58108119 | 11/1981 | Japan | |
| 805273 | 2/1981 | U.S.S.R. | 264/40.6 |
| 875354 | 10/1981 | U.S.S.R. | 425/144 |

Primary Examiner—Jeffery Thurlow
Attorney, Agent, or Firm—Darby & Darby

[57] ABSTRACT

A system for controlling a temperature of a molten resin in a cylinder of an extruder includes a plurality of temperature detecting elements which are disposed in a wall of the cylinder generally in a plane perpendicular to a longitudinal axis of the cylinder to detect the temperature of the cylinder. The temperature detecting elements are radially spaced by different distances from an inner peripheral surface of the cylinder wall. Detecting devices are provided for detecting an ambient temperature of the extruder and the number of revolutions of a screw of the extruder. A microprocessor unit is programmed to be responsive to detecting signals from the temperature detecting elements and detecting devices to calculate a proper estimated temperature of the molten resin and to calculate a difference between a desired temperature of the resin and the estimated temperature and to determine in accordance with this difture with one of the temperatures detected by the temperature regulating device compares the set temperature with one of the tempertures detected by the temperature detecting elements to produce a temperature control signal in response to which the temperature of the portion of the cylinder where the one temperature detecting element is disposed is brought into agreement with the set temperature.

7 Claims, 6 Drawing Figures

SYSTEM FOR CONTROLLING TEMPERATURE OF MOLTEN RESIN IN CYLINDER OF EXTRUDER

BACKGROUND OF THE INVENTION

1. Field of the Invention

This invention relates to a system for controlling a temperature of a molten resin in a cylinder of an extruder to an optimum temperature.

2. Prior Art

In the extruding of a plastics material or resin, it is necessary to control temperatures of the resin in preselected regions of a cylinder of an extruder to respective optimum temperatures so as to increase an extrusion rate, reduce the scorching of the resin and lower energy costs involved. In addition, this is necessary particularly when an extruded resin is used as an electrical insulation for wires and cables. The reason is that electrical characteristics of the insulation is adversely affected if the resin insulation is not properly temperature-controlled during the extruding operation.

Figure 1:
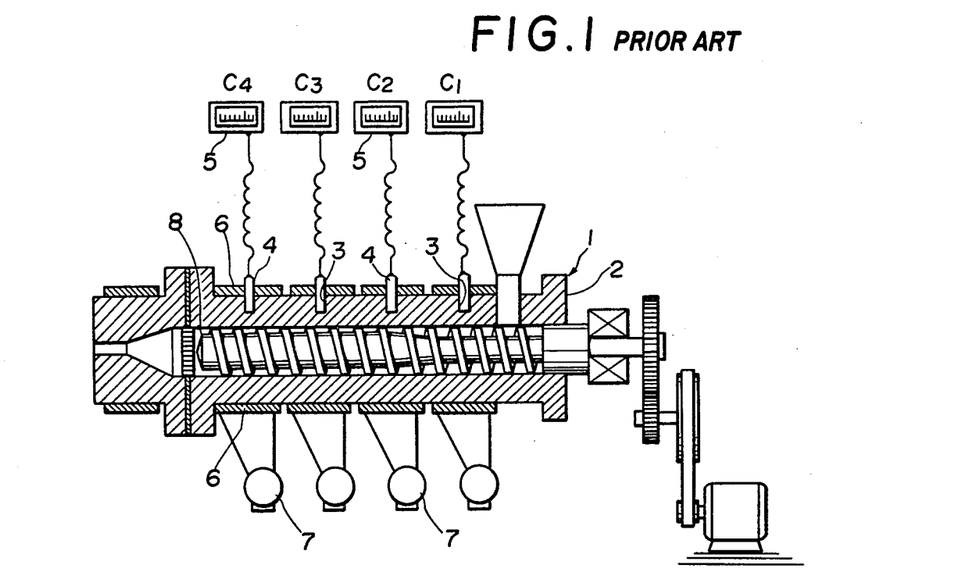
FIG. 1 is a schematic view of an extruder having a conventional resin temperature control system.
Figure 2:
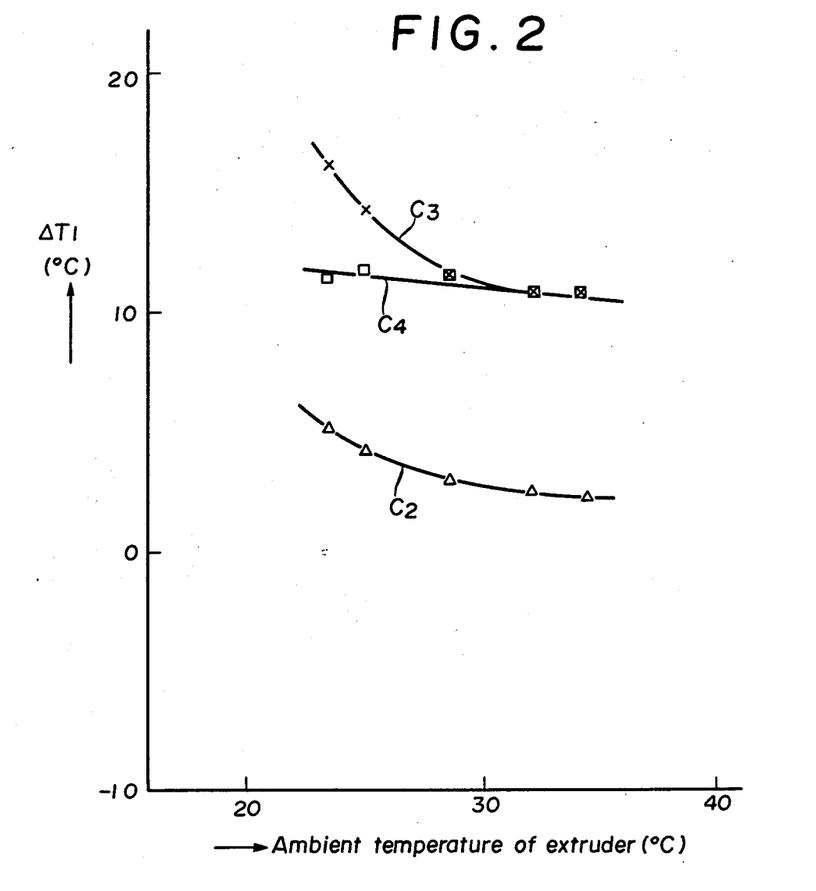
FIG. 2 is a graph showing a relation between the ambient temperature of the extruder and $\Delta T_1$.
Figure 3:
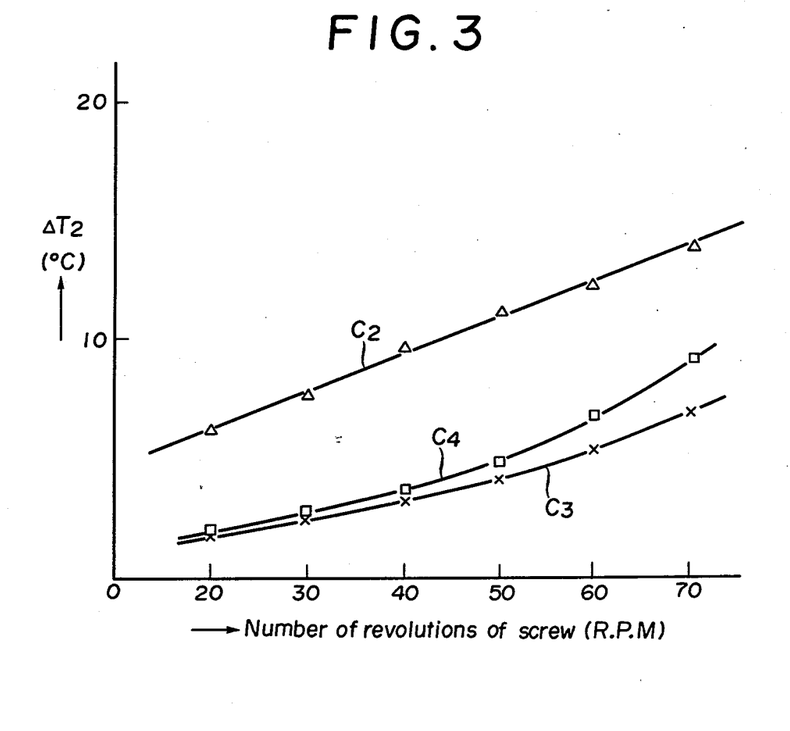
FIG. 3 is a graph showing a relation between the number of revolutions of the screw and $\Delta T_2$.

FIG. 1 shows a conventional extruder 1 with a resin temperature control means. A plurality of holes 3 are formed in a cylinder or barrel 2 at a feed region, a compression region and a metering region, each hole 3 terminating short of the inner peripheral surface of the cylinder 2. Temperature detecting elements 4 are inserted in the holes 3, respectively, to detect the temperatures of the regions of the cylinder 2. Band heaters 6 (or embedded heater) and cooling blowers 7 are mounted on the cylinder 2. In operation, the temperature detecting elements 4 detect the temperatures of the regions of the cylinder 2 and feed temperature detecting signals to temperature regulating devices 5, respectively. The band heaters 6 and the cooling blowers 7 are controlled through the respective temperature regulating devices 5 to control the temperatures of the cylinder regions to their desired temperatures. With this resin temperature control method, however, it has been found that there is a considerable difference between the temperature of the cylinder 2 at each region and the temperature of the molten resin in the cylinder. More specifically, as shown in FIG. 2, a temperature difference $\Delta T_1$ is produced between the temperature of the inner peripheral surface of the cylinder 2 and the temperature of the cylinder at the regions $C_2$, $C_3$ and $C_4$ on account of a variation of the ambient temperature of the extruder 1. Also, as shown in FIG. 3, on account of a variation of the number of revolutions of the screw, the temperature difference between the actual resin temperature and the temperature of the cylinder 2 is further increased in an amount of $\Delta T_2$. Therefore, the molten resin in the cylinder 2 is heated to above its optimum temperature, and the energy is wasted. $C_2$, $C_3$ and $C_4$ in FIGS. 2 and 3 indicate the above-mentioned regions at which the temperature detecting elements are disposed, and correspond respectively to $C_2$, $C_3$ and $C_4$ where the temperature regulating devices 5 are disposed. For example, in the extrusion of polyethylene resin, when the set temperature of the temperature regulating device 5 is 120° C. and the temperature of the cylinder 2 detected by the temperature detecting element 4 is 120° C., the actual temperature of the molten resin is 130° to 140° C. The temperature of the molten resin in the cylinder 2 is further affected by the set temperature of the extruder, the shape of the screw and the kind of the resin (the grade of the resin and so on) as well as the number of revolutions of the screw and the ambient temperature of the extruder. Therefore, it has been found almost impossible to accurately detect the actual temperature of the molten resin through the temperature detecting elements 4 received in the holes 3 of the cylinder 2.

In order to overcome the disadvantages of the above conventional resin temperature control method, another conventional resin temperature control system is proposed in Japanese Patent Application Laid-Open No. 55-121042. In this system, first and second temperature detecting elements are mounted in a wall of an extruding cylinder, the first temperature detecting element being disposed adjacent to the inner peripheral surface of the cylinder while the second temperature detecting element is disposed adjacent to the outer peripheral surface of the cylinder. The first and the second temperature detecting elements are disposed in a plane perpendicular to the longitudinal axis of the cylinder. The first temperature detecting element and a first temperature setting device are electrically connected to a first comparator, the first temperature setting device being adapted to set a target temperature of the portion of the cylinder adjacent to the inner peripheral surface thereof. Similarly, the second temperature detecting element and a second temperature setting device are electrically connected to a second comparator, the second temperature setting device being adapted to set a target temperature of the portion of the cylinder adjacent to the outer peripheral surface thereof. An output of the first comparator is connected to an output of the second temperature setting device. An output of the second comparator is electrically connected to a temperature control device such as a heater and a blower mounted around the cylinder. For example, when the temperature of the portion of the cylinder adjacent to the inner peripheral surface thereof is lower than the target temperature set by the first temperature setting device, the first comparator feeds a positive signal to a line connecting the output of the second temperature setting device to an input of the second comparator. Therefore, the output signal from the second temperature setting device is rectified by the output signal from the first comparator and is applied to the second comparator. Then, the temperature control device is operable in response to the output signal from the second comparator to heat the cylinder to thereby raise the temperature of the portion of the cylinder adjacent to the inner peripheral surface thereof. In contrast, when the temperature of the portion of the cylinder adjacent to the inner peripheral surface thereof is higher than the target temperature thereof, the temperature control device is operated to cool the cylinder. Similarly, when the temperature of the portion of the cylinder adjacent to the outer peripheral surface thereof is lower than the target temperature set by the second temperature setting device and rectified by the output signal from the first comparator, the temperature control device is operated through the second comparator to heat the cylinder. In contrast, when the temperature of the portion of the cylinder adjacent to the outer peripheral surface thereof is higher than the rectified target temperature, the temperature control device is operated to cool the cylinder. With this conventional control system, however, it has been impossible to accurately control the actual temperature of the molten resin, since this temperature control is effected merely by controlling the temperature of the cylinder through the measurement of the temperature of the cylinder wall, and the above-mentioned temperature variation is caused by the number of revolutions of the screw and the ambient temperature of the extruder and etc.

In order to overcome the deficiencies of the above two prior art methods, it has been proposed to provide temperature detecting elements on the inner peripheral surface of the cylinder or on the extruding screw so that they are in direct contact with the molten resin in the cylinder. With this method, the temperature of the molten resin can be measured accurately. However, since the temperature detecting elements are always in contact with the molten resin during the operation of the extruder, the sensitive portions of the temperature detecting elements are susceptible to wear. This required a frequent replacement of the temperature detecting elements. Therefore, such extruders could not be continuously operated for a long period of time. In addition, since the temperature detecting elements are disposed in the cylinder, the molten resin tends to reside in the cylinder. Further, in the case where holes are provided through the cylinder wall to receive the temperature detecting elements with the sensitive portions thereof disposed within the cylinder, cracks tend to develop in the cylinder wall adjacent the through holes.

Japanese Patent Application Laid-Open No. 56-191906 discloses a method of controlling the temperature of a resin in an extruder in which method temperature variations of the molten resin, caused by the number of revolutions of an extruding screw, the ambient temperature of an extruder and so on, are corrected. A plurality of temperature detecting elements are inserted respectively in holes formed in a wall of an extruding cylinder at regions spaced along the length thereof, each hole terminating short of the inner peripheral surface of the cylinder. Each temperature detecting element detects the temperature of the portion of the cylinder wall where it is mounted, and produces a temperature detecting signal which is converted into a digital signal. The microprocessor system is programmed to be responsive to this digital signal to calculate an estimated temperature of the portion of the cylinder wall. Parameter detecting means are provided for detecting parameters which change the temperature of the molten resin in the extruding cylinder, such as the number of revolutions of the extruding screw and the ambient temperature of the extruder. The microprocessor is programmed to be responsive to the parameter data from the parameter detecting means to calculate corrected temperature in accordance with a predetermined program stored in an associated memory and then to add this corrected temperature to the temperature of the cylinder measured by the temperature detecting element to provide an estimated temperature of the molten resin. The microprocessor is programmed to produce output information representative of a difference between the estimated temperature and an optimum temperature of the molten resin, and to produce output information representative of a set temperature of a temperature regulating device in accordance with this difference. The temperature regulating device compares this output information with the signal from the temperature detecting element to produce a temperature control signal. Then, a temperature control means such as a heater and blower is responsive to this temperature control signal to control the temperature of the cylinder, thereby controlling the temperature of the molten resin to the optimum temperature. However, this resin temperature control method has also been found not satisfactory in that the temperature of the molten resin can not be controlled to an acceptable level.

Figure 4:
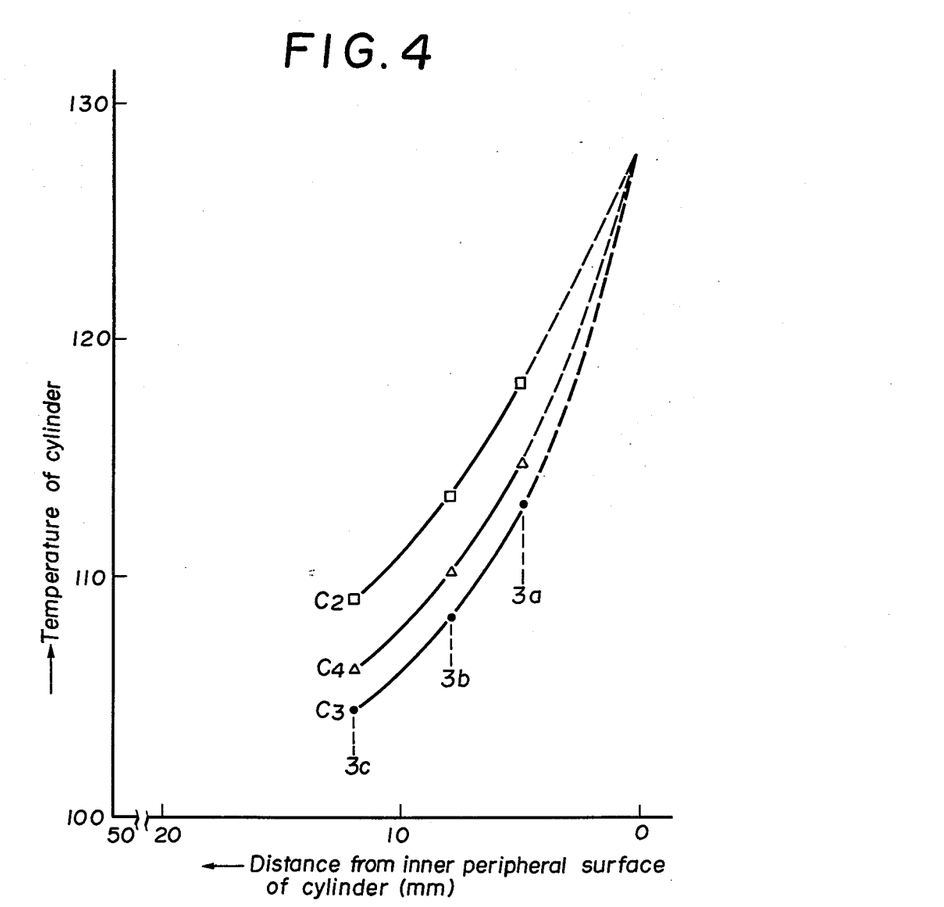
FIG. 4 is a graph showing a temperature profile of a cylinder wall.

It has been found that there exists a temperature profile in the direction of the thickness of the wall of the cylinder 2, as shown in a graph in FIG. 4. In this graph, the abscissa axis represents the radial distance (mm) from the inner peripheral surface of the cylinder 2. In this case, 0 mm indicates the inner peripheral surface of the cylinder 2, and 50 mm indicates the outer peripheral surface of the cylinder 2. The ordinate axis of the graph represents the temperature of the cylinder 2. Curves $C_2$, $C_3$ and $C_4$ represent temperature profiles of the temperature detecting regions $C_2$, $C_3$ and $C_4$ of the extruder 1 in FIG. 1, respectively. It has been found that the temperature of the inner peripheral surface of the cylinder 2 can be estimated by extrapolating each curve into the inner peripheral surface of the cylinder. The present invention is based upon these findings.

SUMMARY OF THE INVENTION

It is therefore an object of this invention to provide a system for controlling a temperature of a molten resin in a cylinder of an extruder in which the temperature of the resin in the cylinder can be accurately estimated so as to be always controlled to an optimum temperature, whereby the increase of amount of extrudate, the reduction of scorching of the resin, the saving of the energy and the prevention of wear of temperature detecting elements are achieved, so that the extruder can be continuously operated for a long period of time.

According to the present invention, there is provided a system for controlling a temperature of a molten resin in a cylinder of an extruder having an extruding screw in said cylinder which system comprising temperature detecting elements received in a wall of said cylinder and disposed generally in a preselected plane perpendicular to a longitudinal axis of said cylinder, said plurality of temperature detecting elements being radially spaced by different distances from an inner peripheral surface of said cylinder wall, and each of said temperature detecting elements being operable to detect the temperature of said cylinder in said preselected plane to thereby produce a temperature detecting signal; means for detecting an ambient temperature of said extruder to produce a first correction signal;

means for detecting the number of revolutions of said screw to produce a second correction signal; analogue-to-digital converter means for converting said temperature detecting signals and first and second correction signals into digital signals;

memory means for storing programs relating to desired temperatures of said molten resin in said cylinder;

a microprocessor unit having first memory means for storing programs relating to corrected temperatures determined by the ambient temperature of said extruder and the number of revolutions of said screw, said microprocessor unit having second memory means for storing programs relating to estimated temperatures of said molten resin, said microprocessor unit being responsive to said digital signals to calculate a proper estimated temperature of said molten resin and to calculate a difference between said desired temperature of said resin and said estimated temperature of said resin and to determine in accordance with said difference a set temperature of one of the portions of said cylinder wall in which said plurality of temperature detecting elements are disposed, and said microprocessor unit sending output information representative of said set temperature;

digital-to-analogue converter means for converting said output information into an analogue signal;

temperature regulating means for comparing said analogue signal and the temperature detecting signal from the temperature detecting element disposed at said portion of said cylinder to produce a temperature control signal; and temperature control means operable in response to said temperature control signal for bringing the temperature of said portion of said cylinder wall into agreement with said set temperature.

DESCRIPTION OF THE PREFERRED EMBODIMENT OF THE INVENTION

Figure 5:
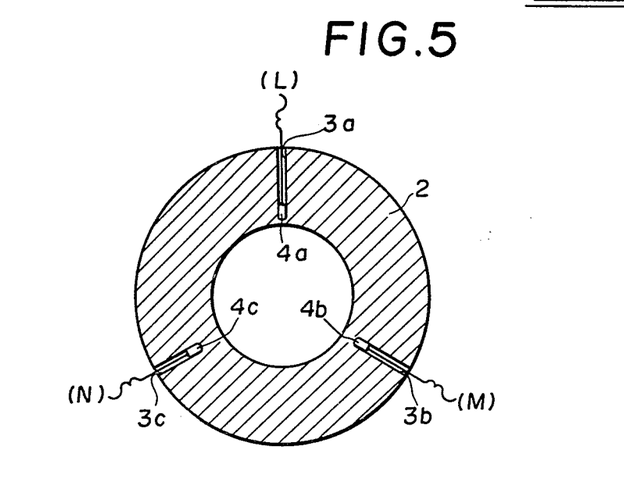
FIG. 5 is a cross-section of a cylinder of an extruder having a resin temperature control system according to the present invention, showing an arrangement of temperature detecting elements.

FIG. 5 shows a cross-section of a cylinder 2 of an extruder 1 taken along a plane perpendicular to a longitudinal axis thereof, an extruding screw being omitted for illustration purposes. The extruder used in this embodiment is identical to the extruder 1 of FIG. 1, and like reference characters denote corresponding parts. With reference to FIG. 1, there are provided three temperature detecting regions $C_2$, $C_3$ and $C_4$ spaced along the length of the cylinder 2. As shown in FIG. 5, three circumferentially spaced holes 3a, 3b and 3c are formed in a wall of the cylinder 2, and disposed in the plane perpendicular to the longitudinal axis of the cylinder 2. These three holes 3a to 3c extend radially of the cylinder 2 and circumferentially spaced from each other by 120 degrees. The inner ends of the three holes 3a to 3c are radially spaced different distances from the inner peripheral surface of the cylinder, respectively. More specifically, the inner ends of the three holes 3a to 3c are spaced 5 mm, 8 mm and 15 mm from the inner peripheral surface of the cylinder 2, respectively. The depths of these holes 3a to 3c vary with the thickness of the cylinder 2, and the above-mentioned distances of the holes 3a to 3c from the inner peripheral surface of the cylinder are preferred in the case where the cylinder wall has a thickness of 25 to 50 mm. Preferably, the shallowest hole 3c should be spaced less than about half the thickness of the cylinder wall from the inner peripheral surface of the cylinder 2 to improve the sensitivity to the variation of a molten resin temperature.

Temperature detecting elements 4a, 4b and 4c such as thermocouples are received respectively in the three holes 3a to 3c and fixed thereto so as to detect the temperatures of the portions of the cylinder 2 where they are mounted. Thus, a temperature profile of the cylinder wall at each of the temperature detecting regions $C_2$, $C_3$ and $C_4$ is obtained by spacing the three temperature detecting elements 4a to 4c by different distances from the inner peripheral surface of the cylinder 2. The temperature profiles of the cylinder 2 at the three temperature detecting regions $C_2$, $C_3$ and $C_4$ are obtained as shown in FIG. 4. In FIG. 5, reference character L designates the position of the first temperature detecting hole 3a, reference character M the position of the second temperature detecting hole 3b, and reference character N the position of the third temperature detecting hole 3c. The temperature detecting elements 4a to 4c detect the temperatures $T_L$, $T_M$ and $T_N$ at the positions L, M and N, respectively, and feed respective temperature detecting signals $S_L$, $S_M$ and $S_N$ representative of the temperatures $T_L$, $T_M$ and $T_N$.

Figure 6:
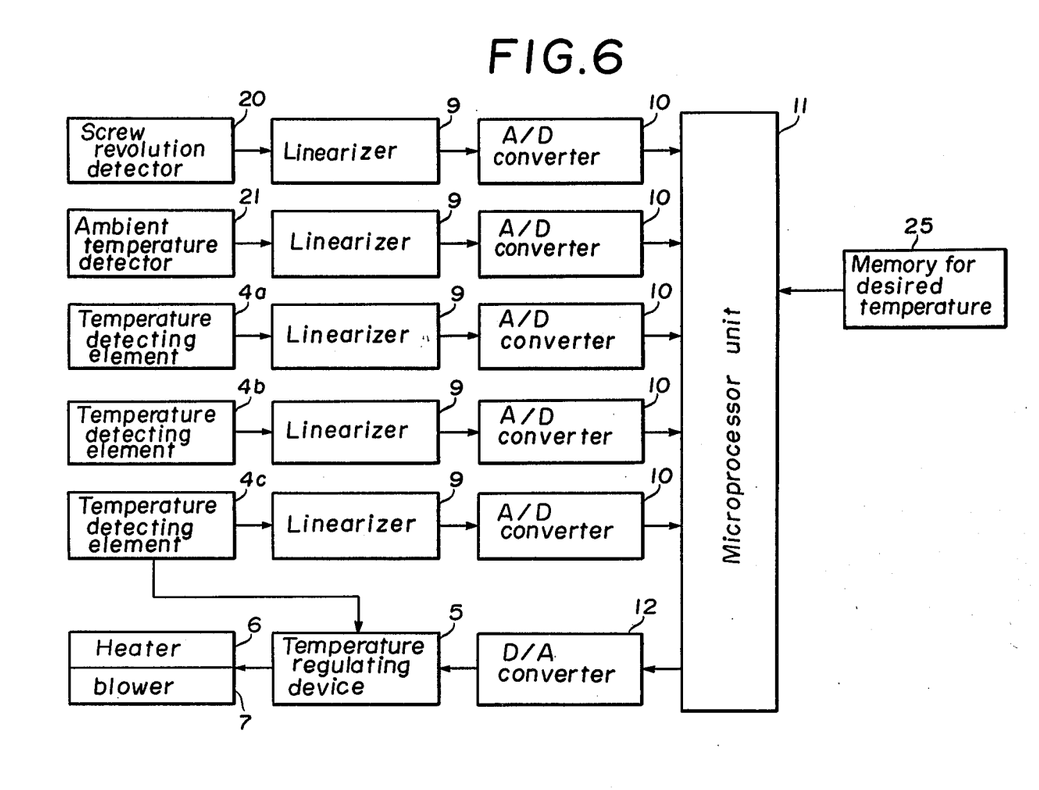
FIG. 6 is a block diagram of the resin temperature control system.

FIG. 6 shows a block diagram of the system for controlling the temperature of a molten resin in the cylinder 2 of the extruder to an optimum temperature. This control system comprises a microprocessor unit 11 which includes memory means and a central processing unit having an arithmetic logic unit, control circuits and registers. The microprocessor has a function for processing input data from the input terminal units as is well known.

The temperature detecting signals $S_L$, $S_M$ and $S_N$ are processed by the microprocessor unit 11. In FIG. 6, for illustration purposes, the temperature control system only includes the components for controlling the temperature of the molten resin at the temperature detecting region $C_2$.

The temperature detecting elements 4a, 4b and 4c detect the temperatures of the portions of the cylinder wall where they are inserted, and feed the temperature detecting signals $S_L$, $S_M$ and $S_N$ representative of the detecting temperature $T_L$, $T_M$ and $T_N$ to respective linearizers 9 where these temperature detecting signals are linearized. Then, the output signals from the linearizers 9 are sent to respective analogue-to-digital converters 10, and digital output signals from these converters 10 are applied to the microprocessor unit 11. Also, a detector 20 detects the number of revolutions of the extruding screw 8, and a detecting signal from the detector 20 is applied through a linearizer 9 and an analogue-to-digital converter 10 to the microprocessor unit 11. Also, a detector 21 detects the ambient temperature of the extruder 1, and a detecting signal from the detector 21 is applied through a linearizer 9 and an analogue-to-digital converter 10 to the microprocessor unit 11. As mentioned above, the number of revolutions of the screw 8 and the ambient temperature of the cylinder 2 change the temperature of the molten resin in the cylinder 2. Other parameters which change the temperature of the molten resin can be input to the microprocessor unit 11. Such parameters include a set temperature, the shape of the screw 8, the kind of resin, the grade of the resin. The data from the detectors 20 and 21 and the other input devices for such parameters are used to correct the temperature of the molten resin. The respective linearizers 9 and analogue-to-digital converters 10 may be combined with the detecting elements 4a to 4c and the detectors 20 and 21 to provide detecting means units.

The microprocessor unit 11 has the associated memory means for storing the program relating to the temperature profile such as one shown in FIG. 4. Thus, the microprocessor unit 11 is programmed to be responsive to the digital temperature detecting signals $S_L$, $S_M$ and $S_N$ to calculate the temperature profile to determine the temperature of the inner peripheral surface of the cylinder 2 representing the temperature of the molten resin in the cylinder 2. For example, then the temperature profile is represented by a curve of secondary degree, the following equation is provided:

$$y = ax^2 + bx + c \tag{1}$$

wherein y is the temperature of the cylinder 2, and x is the distance of each temperature detecting element 4a, 4b, 4c from the inner peripheral surface of the cylinder 2.

$x_L$ and $y_{TL}$, $x_M$ and $y_{TM}$, and $x_N$ and $y_{TN}$ which correspond respectively to the above-mentioned positions L, M and N, are inserted into the above equation (1) to provide ternary equations. a, b and c in the above equation (1) are determined by solving the ternary equations so that a formula to represent the temperature profile is provided. Then, in this formula, zero is substituted for x so that the temperature of the inner peripheral surface of the cylinder 2 is determined.

The microprocessor unit 11 has the associated memory means for storing the programs relating to corrected temperatures determined by the above-mentioned temperature changing parameters such as the number of revolutions of the screw 8, the ambient temperature of the extruder, the set temperature, the shape of the screw 8, the kind of the resin, the grade of the resin and so on. The more parameters are selected, the more accurately the resin temperature control is carried out.

The microprocessor unit 11 is thus programmed to be responsive to the digital detecting signals from the detectors 20 and 21 and inputs from the input devices for the other temperature changing parameters so that the corrected temperature is added to the temperature of the inner peripheral surface of the cylinder 2 calculated from the above-mentioned temperature profile, thereby providing an estimated temperature of the molten resin. Preferably, among the temperature changing parameters, at least two parameters should be input to the microprocessor unit 11 to provide a reliable estimated temperature. A memory 25 for storing a program relating to desired temperature of the molten resin in the cylinder 2 is connected to the microprocessor unit 11. This memory 25 may be incorporated in the microprocessor unit 11. The microprocessor unit 11 is programmed to compare the estimated temperature with the desired temperature to calculate a difference therebetween. The microprocessor unit 11 is programmed to calculate a set temperature of a temperature regulating device 5 in accordance with the difference between the estimated temperature and the desired temperature. The microprocessor unit 11 produces a digital output signal representative of the set temperature, and this signal is sent to the temperature regulating device 5 through a digital-to-analogue converter 12. The temperature detecting element 4c is connected to the temperature regulating device 5. The temperature regulating device 5 compares the detecting signal $S_N$ from the temperature detecting element 4c with the temperature setting signal from the converter 12 to produce a temperature control signal. This temperature control signal is applied to the temperature control device having a heating means 6 and a cooling means 7 so that either the heating means or the cooling means is actuated to bring the temperature $T_N$ into agreement with the set temperature. Instead of the temperature detecting element 4c, either the temperature detecting elements 4a or 4b may be connected to the temperature regulating device 5, but the temperature detecting element 4c disposed farthest from the inner peripheral surface of the cylinder 2 is most preferred. A band heater or an embedded heater is used as the heating means 6, and a blower is used as the cooling means 7. Also, at the same time, the information on the temperature change of the positions L, M and N of the cylinder 2 are input to the microprocessor unit 11 by the temperature detecting elements 4a, 4b and 4c, so that a timing of sending of the above-mentioned set temperature to the temperature regulating device 5 is determined. Thus, by bringing the temperature $T_N$ into agreement with the set temperature, the estimated temperature is brought into agreement with the desired temperature.

As described above, with the resin temperature control system according to the present invention, the three temperature detecting elements 4a, 4b and 4c are received in the cylinder wall at different distances from the inner peripheral surface of the cylinder 2, so that the temperature profile of the cylinder wall is determined, thereby determining the temperature of the molten resin in the cylinder 2. Therefore, the temperature detecting elements 4a to 4c are not disposed in contact with the molten resin in the cylinder 2 so that they are not subjected to wear. Further, the corrected temperature determined by the parameters such as the number of revolutions of the screw, the ambient temperature of the extruder, the shape of the screw, the set temperature and the kind of the resin, which change the temperature of the molten resin in the cylinder 2, is added to provide the estimated temperature. Thus, even if the number of revolutions of the screw, the ambient temperature of the extruder, the shape of the screw, the set temperature and the kind of the resin are changed, the estimated temperature is always accurate. Then, the difference between the estimated temperature and the desired temperature is provided, and the set temperature of the temperature regulating device 5 is calculated based on this difference. The temperature of the position N of the cylinder farthest from the inner peripheral surface of the cylinder is controlled in accordance with the set temperature, so that temperature of the molten resin is brought into agreement with the desired temperature without delay. In addition, a cycling phenomenon of the temperature of the molten resin caused by a time delay of the heat passing through the cylinder 2 is reduced. Further, the above-mentioned calculation or processing is performed by the microprocessor unit 11, and therefore the control speed is increased so that the temperature of the molten resin is brought into agreement with the desired temperature in a short time.

In the above embodiment, the number of the temperature detecting elements at each temperature detecting region is three, but there are some cases where the temperature profile of the cylinder wall is represented by the following equations (2) and (3);

$$y = ax + b \tag{2}$$

$$y = a \ln x + b \tag{3}$$

In these cases, two temperature detecting elements 4a and 4b are used.

Further, more than three temperature detecting elements can be used to provide the more accurate estimated temperature. Also, in the above embodiment, the three temperature detecting elements 4a to 4c are arranged in circumferentially spaced relation, but the arrangement is not to be limited to this so far as the temperature detecting elements are spaced from the inner peripheral surface of the cylinder 2 at different distances.

Further, in the above embodiment, the resin temperature control system controls the temperature of the cylinder 2 at the regions $C_2$, $C_3$ and $C_4$, but the system may further control the region $C_1$. Usually, it is sufficient to control the three regions $C_2$, $C_3$ and $C_4$.

Further, instead of the above-mentioned heating and cooling means, a suitable fluid heating medium such as silicone oil may be used.

The invention will be illustrated by the following examples:

EXAMPLE 1

The resin temperature control method according to this invention was carried out, using an extruder 1 with ordinary PID-type temperature regulating devices (screw diameter: 50 mm; L/D=20; thickness of cylinder wall: 25 mm) by which low-density polyethylene having a crosslinking agent was extruded.

Two temperature detecting elements 4a and 4b located at the positions L and M in FIG. 5 were used. The temperature profile of the cylinder 2 is represented by the following equation:

$$y = ax + b \tag{1}$$

wherein y is the temperature of the cylinder 2 (°C.), and x is the distance (mm) between the inner peripheral surface of the cylinder 2 and the tip of the temperature detecting element. In the equation (1), the temperature corrected by the addition of the corrected temperature, that is to say, an estimated temperature is represented by Y.

The distance (x) and the temperature (y) at the temperature detecting position L are represented by $x_L$ and $y_L$, respectively. Also, the distance (x) and the temperature detecting position M are represented by $x_M$ and $y_M$, respectively. Then, the following equations are obtained:

$$a = \frac{y_L - y_M}{x_L - x_M}$$

$$b = \frac{y_L x_M - y_M x_L}{x_M - x_L}$$

Therefore, the following equation is obtained:

$$y = \frac{y_L - y_M}{x_L - x_M} x + \frac{y_L x_M - y_M x_L}{x_M - x_L} \tag{1'}$$

The corrected temperature to be added is represented by the following:

$$(y_L - y_M) \times n$$

wherein n is obtained from predetermined formulas which are programmed in the microprocessor unit 11 and relate to the number of revolutions of the screw and the ambient temperature of the extruder.

The value of n is obtained through the measurement of the actual temperature of the resin under the influence of the number of revolutions of the screw and the ambient temperature of the extruder, using an extruder for temperature measuring purposes. The above-mentioned predetermined formulas are obtained from the experimental values of n so obtained.

The inner peripheral surface of the cylinder 2 is indicated by x=0 (mm), and 0 is substituted for x in the equation (1') to obtain the following equation:

$$y = \frac{y_L x_M - y_M x_L}{x_M - x_L} \tag{1''}$$

Therefore, the estimated temperature Y (°C.) is represented by the following equation:

$$Y = \frac{y_L x_M - y_M x_L}{x_M - x_L} + (y_L - y_M) \times n \tag{2}$$

When $x_M$ is 10 mm, and $x_L$ is 5 mm, the following is obtained from the equation (2):

$$Y = 2y_L - y_M + (y_L - y_M) \times n \tag{2'}$$

The set temperature at the temperature detecting position M of each of the regions $C_1$ to $C_4$ are as follows:
The region $C_1$: 120° C. (fixed)
The regions $C_2$, $C_3$ and $C_4$: determined by the output information from the microprocessor unit 11.

The desired temperature E of the molten resin of each of the regions $C_1$ to $C_4$ are as follows:
The region $C_1$: not predetermined
The region $C_2$: 126° C.
The region $C_3$: 128° C.
The region $C_4$: 130° C.

The desired temperatures of the molten resin of the regions $C_2$, $C_3$ and $C_4$ are stored in the memory means of the microprocessor unit 11.

In the resin temperature control system of this invention, new set temperatures are calculated by the following formula, and information representative of such new set temperatures are sent to the respective temperature regulating devices 5.

The new set temperature = the present set temperature $$\{Y - (E)\} \times 0.9 \tag{3}$$

The factor (0.9) is selected so that the actual resin temperature asymptotically approaches the desired temperature of the resin from below. This factor may be 1, but in such a case, the actual resin temperature may often exceed the desired resin temperature.

Under the above conditions, the actual temperature A of the resin was measured, changing the number of revolutions of the screw in three ways, i.e., 30 rpm, 60 rpm and 70 rpm. The differences between the actual resin temperatures A and the desired resin temperatures E were observed. Table 1 shows $y_L$, $y_M$, n, Y, the actual resin temperature A, the desired resin temperature E and (A−E) at each region after the set temperature was changed two to four times by the output information from the microprocessor unit from the beginning of the operation of the extruder. The actual resin temperatures A were measured by forming holes through the cylinder wall and inserting temperature detecting elements through those holes into contact with the resin in the cylinder.

TABLE 1

| Number of revolutions of screw (R.P.M.) | Region of cylinder | $y_L$ (°C.) | $y_M$ (°C.) | n | Y (°C.) | Actual resin temperature (A) (°C.) | Desired resin temperature (E) (°C.) | (A)−(E) (°C.) |
|---|---|---|---|---|---|---|---|---|
| 30 | C$_2$ | 124.6 | 123.8 | 1.18 | 126.3 | 127.0 | 126.0 | 1.0 |
|    | C$_3$ | 121.3 | 119.0 | 1.82 | 127.8 | 127.0 | 128.0 | −1.0 |
|    | C$_4$ | 125.0 | 123.6 | 2.58 | 130.0 | 131.5 | 130.0 | 1.5 |
| 60 | C$_2$ | 117.8 | 116.0 | 3.37 | 125.7 | 124.8 | 126.0 | −1.2 |
|    | C$_3$ | 112.0 | 106.8 | 2.10 | 128.1 | 126.0 | 128.0 | −2.0 |
|    | C$_4$ | 116.4 | 111.6 | 1.87 | 130.2 | 127.8 | 130.0 | −2.2 |
| 70 | C$_2$ | 115.9 | 113.6 | 3.37 | 126.0 | 124.5 | 126.0 | −1.5 |
|    | C$_3$ | 110.1 | 103.8 | 1.92 | 128.5 | 125.8 | 128.0 | −2.2 |
|    | C$_4$ | 114.6 | 109.2 | 1.84 | 129.9 | 127.5 | 130.0 | −2.5 |

As is clear from Table 1, even the maximum difference between the actual resin temperature and the desired resin temperature (A−E) is about 2.5° C. Thus, the resin temperature control can be carried out accurately, and with this method, the quality of the extruded product and the productivity are much improved.

EXAMPLE 2

The resin temperature control was effected according to the above procedure in EXAMPLE 1 except that n is obtained from predetermined formulas which are programmed in the microprocessor unit 11 and relate to the number of revolutions of the screw, the ambient temperature of the extruder, the shape of the extruding screw, the set temperature and the kind of the resin (molecular weight, melt index and so on).

The results obtained are shown in Table 2.

TABLE 2

| Number of revolutions of screw (R.P.M.) | Region of cylinder | $y_L$ (°C.) | $y_M$ (°C.) | n | Y (°C.) | Actual resin temperature (A) (°C.) | Desired resin temperature (E) (°C.) | (A)−(E) (°C.) |
|---|---|---|---|---|---|---|---|---|
| 30 | C$_2$ | 122.8 | 121.5 | 1.38 | 125.9 | 124.9 | 126.0 | −1.1 |
|    | C$_3$ | 121.7 | 119.5 | 1.77 | 127.8 | 127.4 | 128.0 | −0.6 |
|    | C$_4$ | 123.9 | 122.3 | 2.88 | 130.1 | 130.3 | 130.0 | 0.3 |
| 60 | C$_2$ | 118.7 | 117.0 | 3.24 | 125.9 | 125.6 | 126.0 | −0.4 |
|    | C$_3$ | 114.6 | 109.8 | 1.85 | 128.3 | 128.6 | 128.0 | 0.6 |
|    | C$_4$ | 119.0 | 114.6 | 1.57 | 130.3 | 130.1 | 130.0 | 0.1 |
| 70 | C$_2$ | 117.1 | 115.0 | 3.22 | 126.0 | 125.7 | 126.0 | −0.3 |
|    | C$_3$ | 112.5 | 106.6 | 1.65 | 128.1 | 128.3 | 128.0 | 0.3 |
|    | C$_4$ | 117.4 | 112.3 | 1.52 | 130.3 | 130.2 | 130.0 | 0.2 |

As is clear from Table 2, even the maximum difference between the actual resin temperature and the desired resin temperature (A−E) is about 1° C. Thus, the resin temperature control can be carried out accurately.

EXAMPLE 3

The resin temperature control was effected according to the above procedure in EXAMPLE 2 except that a compound with medium-density polyethylene for silane crosslinking was used as the resin.

The results obtained are shown in Table 3.

TABLE 3

| Number of revolutions of screw (R.P.M.) | Region of cylinder | $y_L$ (°C.) | $y_M$ (°C.) | n | Y (°C.) | Actual resin temperature (A) (°C.) | Desired resin temperature (E) (°C.) | (A)−(E) (°C.) |
|---|---|---|---|---|---|---|---|---|
| 30 | C$_2$ | 209.0 | 208.5 | 1.20 | 210.1 | 210.5 | 210.0 | 0.5 |
|    | C$_3$ | 203.9 | 199.8 | 1.65 | 214.8 | 214.9 | 215.0 | −0.1 |
|    | C$_4$ | 208.8 | 205.2 | 2.23 | 220.4 | 220.2 | 220.0 | 0.2 |
| 60 | C$_2$ | 207.0 | 206.3 | 3.01 | 209.8 | 209.9 | 210.0 | −0.1 |
|    | C$_3$ | 201.1 | 195.7 | 1.60 | 215.1 | 215.4 | 215.0 | 0.4 |
|    | C$_4$ | 207.3 | 202.1 | 1.40 | 219.8 | 219.9 | 220.0 | −0.1 |
| 70 | C$_2$ | 206.1 | 205.1 | 2.97 | 210.1 | 210.6 | 210.0 | 0.6 |
|    | C$_3$ | 200.1 | 193.9 | 1.45 | 215.3 | 215.1 | 215.0 | 0.1 |
|    | C$_4$ | 207.0 | 201.5 | 1.36 | 220.0 | 220.4 | 220.0 | 0.4 |

As clear from Table 3, even the maximum difference between the actual resin temperature and the desired resin temperature (A−E) is about 0.6° C. Thus, the resin temperature control can be carried out quite accurately.

For comparison purposes, the following comparative EXAMPLES illustrating the conventional resin temperature control methods will be described.

COMPARATIVE EXAMPLE 1

In this COMPARATIVE EXAMPLE 1, the conventional resin temperature control method shown in FIG. 1 was carried out, using the same extruder in EXAMPLE 1. The temperature detection was effected at the position M (FIG. 5) of each of the regions $C_1$, $C_2$, $C_3$ and $C_4$, and the detected temperatures were controlled to 120° C. by ordinary PID-type temperature regulating devices. The resin used, the measurement method of the actual resin temperature, the desired resin temperature, and the number of revolutions of the screw are the same as those in EXAMPLE 1. Table 4 shows the temperature of the position M, the actual resin temperature A, the desired resin temperature E and (A−E) at each region.

TABLE 4

| Number of revolutions of screw (R.P.M.) | Region of cylinder | $y_M{}^*$ (°C.) | Actual resin temperature (A) (°C.) | Desired resin temperature (E) (°C.) | (A)-(E) (°C.) |
|---|---|---|---|---|---|
| 30 | $C_2$ | 120.0 | 123.7 | 126.0 | −2.3 |
|  | $C_3$ | 120.0 | 127.3 | 128.0 | −0.7 |
|  | $C_4$ | 120.1 | 128.5 | 130.0 | −1.5 |
| 60 | $C_2$ | 120.0 | 127.0 | 126.0 | 1.0 |
|  | $C_3$ | 119.8 | 132.7 | 128.0 | 4.7 |
|  | $C_4$ | 120.1 | 136.0 | 130.0 | 6.0 |
| 70 | $C_2$ | 120.2 | 129.1 | 126.0 | 3.1 |
|  | $C_3$ | 119.8 | 135.7 | 128.0 | 7.7 |
|  | $C_4$ | 120.1 | 137.8 | 130.0 | 7.8 |

$y_M{}^*$ is the temperature of the cylinder at the position M. As is clear from Table 4, the maximum difference between the actual resin temperature and the desired resin temperature (A–E) is about 8° C. In the case where the number of revolutions of the screw is above 70 R.P.M., (A–E) will be above 10° C.

COMPARATIVE EXAMPLE 2

In this COMPARATIVE EXAMPLE, the conventional resin temperature control method disclosed in Japanese Patent Application Laid-Open No. 56-191906 was carried out, using the same extruder in EXAMPLE 1. The temperature detection was effected at the position M (FIG. 5) of each region. An estimated temperature of the resin is obtained from the following formula:

$$Y = y_M + \Delta T_1 + \Delta T_2 \qquad (11)$$

wherein Y is the estimated resin temperature, $y_M$ is the temperature of the cylinder at the position M, $\Delta T_1$ is the corrected temperature due to the ambient temperature of the extruder, and $\Delta T_2$ is the corrected temperature due to the number of revolutions of the screw. Low density-polyethylene having a crosslinking agent was extruded.

The set temperature at each region is as follows:
The region $C_1$: 120° C. (fixed)
The regions $C_2$, $C_3$ and $C_4$ . . . determined by the output information from the microprocessor.

The desired temperature E of the resin at each region is as follows:
The region $C_1$: not predetermined
The region $C_2$: 126° C.
The region $C_3$: 128° C.
The region $C_4$: 130° C.

These desired temperatures E of the resin at the regions $C_2$, $C_3$ and $C_4$ are stored in the memory of the microprocessor unit.

In this conventional temperature control method, new set temperatures at the position M are calculated by the following formula, and information representative of such new set temperatures are sent to the respective temperature regulating devices.

The new set temperature = the present set temperature $$(Y - E) \times 0.9 \qquad (12)$$

The other conditions are the same as in EXAMPLE 1, and the extrusion was carried out. Table 5 shows $y_M$, Y, the actual resin temperature A, the desired resin temperature E and (A−E) at each region after the set temperature was changed two to four times by the output information of the microprocessor unit from the beginning of the operation of the extruder.

TABLE 5

| Number of revolutions of screw (R.P.M.) | Region of cylinder | $y_M{}^*$ (°C.) | $Y^{**}$ (°C.) | Actual resin temperature (A) (°C.) | Desired resin temperature (E) (°C.) | (A)-(E) (°C.) |
|---|---|---|---|---|---|---|
| 30 | $C_2$ | 120.9 | 126.3 | 124.0 | 126.0 | −2.0 |
|  | $C_3$ | 118.6 | 127.8 | 126.7 | 128.0 | −1.3 |
|  | $C_4$ | 120.6 | 129.9 | 128.5 | 130.0 | −1.5 |
| 60 | $C_2$ | 116.0 | 125.8 | 124.5 | 126.0 | −1.5 |
|  | $C_3$ | 111.9 | 128.4 | 130.8 | 128.0 | 2.8 |
|  | $C_4$ | 117.3 | 130.5 | 133.0 | 130.0 | 3.0 |
| 70 | $C_2$ | 112.5 | 125.6 | 123.2 | 126.0 | −2.8 |
|  | $C_3$ | 109.0 | 127.5 | 132.1 | 128.0 | 4.1 |
|  | $C_4$ | 115.1 | 129.5 | 134.5 | 130.0 | 4.5 |

$y_M{}^*$ is the temperature of the cylinder at the position M.
$Y^{**}$ is the estimated temperature of the resin.

As is clear from Table 5, the maximum difference between the actual resin temperature and the desired resin temperature (A−E) is about 4.5° C. Although this conventional control method is more accurate than the conventional control method in COMPARATIVE EXAMPLE 1, it is still unsatisfactory.

As described above, in the resin temperature control method according to the present invention, at least two temperature detecting elements are received in the cylinder wall and spaced radially by different distances from the inner peripheral surface of the cylinder. The estimated temperature of the molten resin in the cylinder is calculated through the microprocessor unit in accordance with the temperature detected by each temperature detecting element and the corrected temperature determined by the actually measured parameters which change the temperature of the molten resin, such as the number of revolutions of the screw, the ambient temperature of the extruder, the shape of the extruding screw, the kind of the resin and the set temperature. And, the resin temperature is controlled in accordance with the difference between the estimated temperature and the desired resin temperature. Therefore, according to this invention, even if the above-mentioned parameters are changed, the temperature of the molten resin can be always kept to the desired temperature. In addition, a cycling phenomenon of the resin temperature caused by a time delay of the heat passing through the cylinder is reduced, so that a temperature variation is reduced. As a result, an increase of the amount of extrudate, the reduction of scorching of the resin and the saving of the heat energy are achieved. Therefore, an extrudate product of high quality can be manufactured at low costs. Further, since the temperature detecting elements are not in direct contact with the molten resin, they do not need to be replaced for a prolonged period of time, and the cylinder and the screw are not subjected to damage. Therefore, the extruder can be satisfactorily operated continuously for a long period of time.

While the resin temperature control system according to this invention has been specifically shown and described herein, the invention itself is not to be restricted by the exact showing of the drawings or the description thereof. For example, although the linearizers 9 connect the detectors 20 and 21 and the temperature detecting elements 4a to 4c to the respective analogue-to-digital converters 10 in the illustrated embodiment, these linearizers 9 may be connected between the respective analogue-to-digital converters 10 and the microprocessor unit 11.

What is claimed is:

1. A system for controlling a temperature of a molten resin in a cylinder of an extruder having an extruding screw in said cylinder, said system comprising:
   (a) temperature detecting elements received in a wall of said cylinder and disposed generally in a preselected plane perpendicular to a longitudinal axis of said cylinder, said plurality of temperature detecting elements being radially spaced by different distances from an inner peripheral surface of said cylinder wall, and each of said temperature detecting elements being operable to detect the temperature of said cylinder in said preselected plane to thereby produce a temperature detecting signal;
   (b) means for detecting an ambient temperature of said extruder to produce a first correction signal;
   (c) means for detecting the number of revolutions of said screw to produce a second correction signal;
   (d) analogue-to-digital converter means for converting said temperature detecting signals and said first and second correction signals into digital signals;
   (e) memory means for storing programs relating to desired temperatures of said molten resin in said cylinder;
   (f) a microprocessor unit having first memory means for storing programs relating to corrected temperatures determined by the ambient temperature of said extruder and the number of revolutions of said screw, said microprocessor unit having second memory means for storing programs relating to estimated temperatures of said molten resin, said microprocessor unit being responsive to said digital signals to calculate a proper estimated temperature of said molten resin and to calculate a difference between said desired temperature of said resin and said estimated temperature of said resin and to determine in accordance with said difference a set temperature of one of the portions of said cylinder wall in which said plurality of temperature detecting elements are disposed, and said microprocessor unit sending output information representative of said set temperature;
   (g) digital-to-analogue converter means for converting said output information into an analogue signal;
   (h) temperature regulating means for comparing said analogue signal and the temperature detecting signal from the temperature detecting element disposed at said portion of said cylinder to produce a temperature control signal; and
   (i) temperature control means operable in response to said temperature control signal for bringing the temperature of said portion of said cylinder wall into agreement with said set temperature.

2. A system according to claim 1, in which there are provided a plurality of said temperature detecting means spaced along the length of said cylinder.

3. A system according to claim 1, in which data relating to corrected temperatures determined by at least one of the set temperature, the kind of the resin and the shape of the screw is further input to said microprocessor unit.

4. A system according to claim 1, in which said memory means for said desired temperature is incorporated in said microprocessor unit.

5. A system according to claim 1, in which the temperature detecting element disposed at said portion of said cylinder wall is the one spaced the farthest from the inner peripheral surface of said cylinder wall.

6. A system according to claim 1, further comprising means for linearizing said temperature detecting signals and said first and second correction signals, said analogue-to-digital converter means being operable to convert these linearized signals into digital signals.

7. A system according to claim 1, further comprising means for linearizing said digital temperature detecting signals and said digital first and second correction signals.

* * * * *